United States Patent [19]

Mason

[11] Patent Number: 5,531,306
[45] Date of Patent: Jul. 2, 1996

[54] SPACER FOR WORN CLUTCH BRAKES

[76] Inventor: Ray Mason, Rte. 5, Box 554, Spring Lake, N.C. 28390

[21] Appl. No.: 318,094

[22] Filed: Oct. 5, 1994

[51] Int. Cl.⁶ ............................. F16D 67/02; F16D 65/38; B23P 6/00
[52] U.S. Cl. .................................... 192/13 R; 192/111 R; 192/DIG. 1; 188/196 V; 29/401.1; 29/402.03; 29/434
[58] Field of Search ............................... 192/13 R, 70.13, 192/70.25, 111 R, DIG. 1; 188/196 V, 201; 29/401.1, 402.01, 402.03, 434

[56] References Cited

U.S. PATENT DOCUMENTS

| | | | |
|---|---|---|---|
| 1,396,891 | 11/1921 | Short | 192/111 R |
| 1,686,352 | 10/1928 | Sweet | 192/13 R |
| 2,863,537 | 12/1958 | Root | 192/13 R |
| 3,202,247 | 8/1965 | Schmidt et al. | 192/13 R |
| 5,076,406 | 12/1991 | Gregory et al. | 192/13 R |

FOREIGN PATENT DOCUMENTS

| | | | |
|---|---|---|---|
| 560486 | 4/1944 | United Kingdom | 192/111 R |

*Primary Examiner*—Richard M. Lorence
*Attorney, Agent, or Firm*—John G. Mills and Associates

[57] ABSTRACT

This invention is a spacer that has a plate portion with a U-shaped opening in one end and a foot portion attached to the opposite end. This spacer can be passed through the inspection opening or port of the bell housing of a transmission with the plate portion being inserted between the clutch brake and the transmission housing with the drive shaft disposed within the U-shaped opening in the plate. The foot portion is bolted to the bell housing to hold the spacer in place. The spacer has enough thickness that when the release bearing presses on the clutch brake, the clutch brake will engage the spacer and press the same against the transmission housing to make a worn clutch brake once again operate normally.

10 Claims, 3 Drawing Sheets

SPACER FOR WORN CLUTCH BRAKES

FIELD OF INVENTION

This invention relates to clutch brakes and more particularly to means for extending the useful life of the same.

BACKGROUND OF INVENTION

Land vehicles use clutches to disengage the transmission from the drive shaft during gear changes and when the vehicle is brought to a halt.

Heavy duty land vehicles such as dump trucks, tractor trailer trucks, and the like usually have a clutch brake to retard and stop the rotation of the drive shaft of the clutch upon disengagement of the main clutch. This allows the shifting of gears more effectively.

The clutch brake is connected through linkages to the clutch pedal so that it is operated in unison with the clutch of the vehicle. As the clutch and the associated clutch brake begin to wear, the clutch brake becomes inoperative prior to the clutch wearing out, quite often requiring a number of clutch brake replacements prior to the main clutch being replaced.

Heretofore, the installation of new or rebuilt clutch brakes necessitated partial disassembly of the drive shaft of the main clutch which is difficult to accomplish as well as being time consuming and expensive.

In an effort to overcome the problem of partial disassembly of clutch drive shaft to replace the clutch brake in heavy duty land vehicles, replacement clutch brakes have been developed that are separable into two halves. When the original clutch brake is removed, the halves are placed on opposite sides of the drive shaft and pins are inserted to hold the same together. The problem with these replacement clutch brakes is that the original clutch brake must be removed by cutting with an air chisel or other means. This is extremely difficult and laborious and great care must be taken not to damage the drive shaft and transmission face.

CONCISE EXPLANATION OF PRIOR ART

U.S. Pat. No. 4,512,450 to Daniel A. Babock is considered of interest in that it discloses a separable replacement clutch brake that is held together by pins or other suitable means.

U.S. Pat. No. 4,712,659 to Richard A. Flotow is considered of interest in that it discloses an adjustable clutch brake apparatus adapted to move a clutch brake ring containing an annular friction surface toward a clutch brake wear pad as a friction linings of the associated clutch friction disk becomes worn. This is accomplished through a locking strap.

U.S. Pat. No. 4,667,799 to Martin E. Kummer is considered of interest in that it discloses a shim cap 40 used to adjust for clutch wear but is not specifically for use with a clutch brake.

U.S. Pat. No. 4,690,573 to Joseph L. Huffman is considered of interest in that it discloses an adjustor for thrust washer wear that includes a pair of wedge plates that are moved together to occupy any space that may exist between the swivel and the structure on which it is mounted.

U.S. Pat. No. 2,772,596 to Roger B. Trussell is considered of interest in that it discloses shims with a U-shaped slot used for automobile camber and caster control.

Finally, U.S. Pat. No. 3,980,159 to Charles L. Baxendale is considered of general interest in that it discloses spacer shims used in brake assemblies.

BRIEF DESCRIPTION OF INVENTION

After much research and study into the above mentioned problems, the above invention has been developed to provide a simple, quick and inexpensive means to extend the useful life of clutch brakes.

The above is accomplished through the use of a spacer plate made of a suitable polycarbonate resin material having a thickness of between ⅛ inch and ⅜ inch.

When the clutch brake wears to the point that it no longer operates properly, the inspection plate on the bell housing is removed and the spacer plate of the present invention is inserted between the clutch brake and the transmission housing with the drive shaft being disposed in the U-shaped end of the plate. An angled foot is provided on the end of the spacer plate which is bolted to the bell housing adjacent the inspection port.

As the clutch brake wears further, it is a simple step to unbolt the foot of the spacer plate and remove the same and replace it with a thicker plate which only takes a few minutes to accomplish.

Different overall sizes of the spacer plates and the configuration of the foot portion are provided for transmissions and their associated clutches and clutch brakes made by different manufacturers.

In view of the above, it is an object of the present invention to provide a simple, inexpensive, easy to use, means for extending the useful life of clutch brakes.

Another object of the present invention is to provide a means for extending the life of clutch brakes by providing a spacer that is inserted between the clutch brake and the transmission housing.

Another object of the present invention is to provide a spacer plate made from a polycarbonate resin material such as LEXAN or similar material that is disposed between the clutch brake and the transmission housing to extend the useful life of such clutch brake.

Another object of the present invention is to provide a spacer to extend the useful life of the clutch brake that is mounted on the bell housing.

Other objects and advantages of the present invention will become apparent and obvious from a study of the following description and the accompanying drawings which are merely illustrative of such invention.

DETAILED DESCRIPTION OF INVENTION

Figure 1:
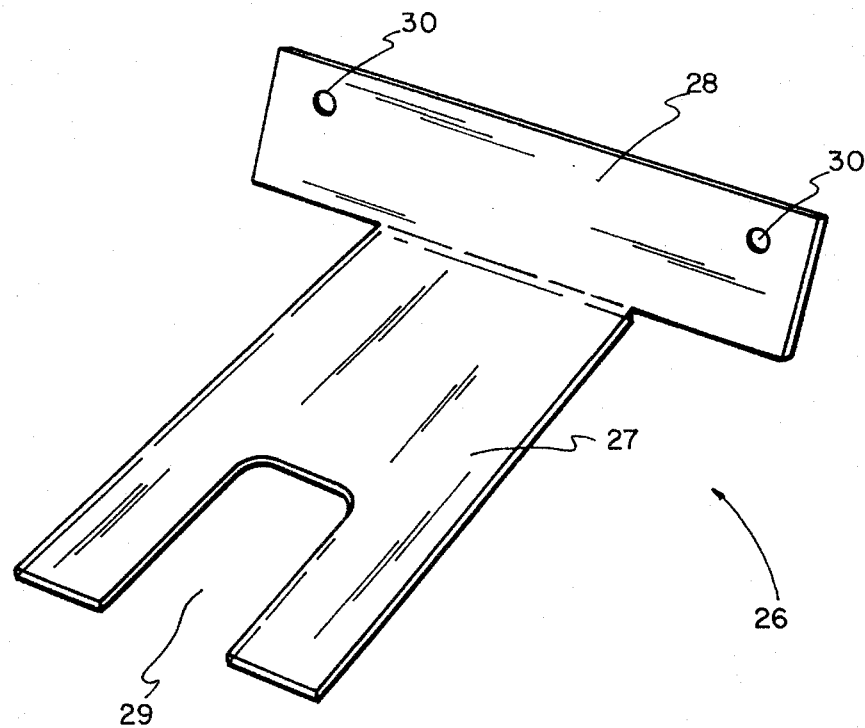
FIG. 1 is a prospective view of one version of the spacer of the present invention.

With further reference to the drawings, a typical heavy vehicle clutch assembly, indicated generally at 10, includes a clutch pedal 11 and its associated clutch pedal arm 12 that is riveted as indicated at 13. An outwardly extending portion 12' of clutch pedal arm 12 is operatively connected to linkage 14. This linkage is in turn operatively connected to one end of bracket 15, the other end of such bracket being operatively connected to linkage 16. The other end of linkage 16 is operatively connected to clutch release fork 17 mounted on drive shaft 19. This drive shaft is operatively connected to the vehicle clutch 18 at one end and passes through the release bearing housing 20 into the transmission housing 21.

A plate-like clutch brake 22 is mounted on drive shaft 19 with interiorly projecting tabs that engage longitudinal slots in said shaft (not shown) so that the clutch brake can move longitudinally on the shaft while at the same time being rotationaly fixed thereto. The clutch brake is mounted between the release bearing housing 20 and the transmission housing 21 as can clearly be seen in FIGS. 3 and 4.

Figure 3:
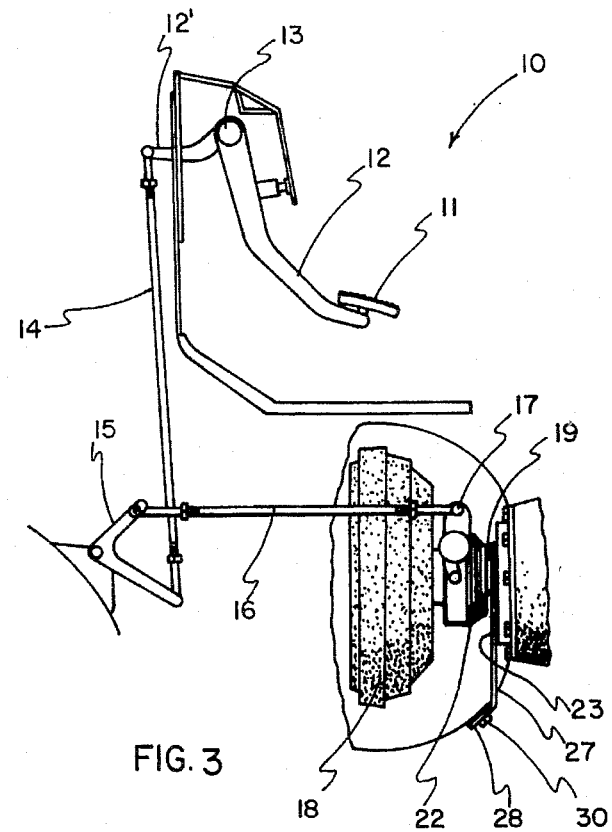
FIG. 3 is a somewhat schematic view of a disengaged clutch brake with the present invention mounted thereon.

When the clutch pedal 11 is in the position shown in FIG. 3, through the various linkages, the clutch release fork 17 engages the clutch mechanism (not shown) within the vehicle clutch 18. The clutch brake 22 is disengaged.

Figure 4:
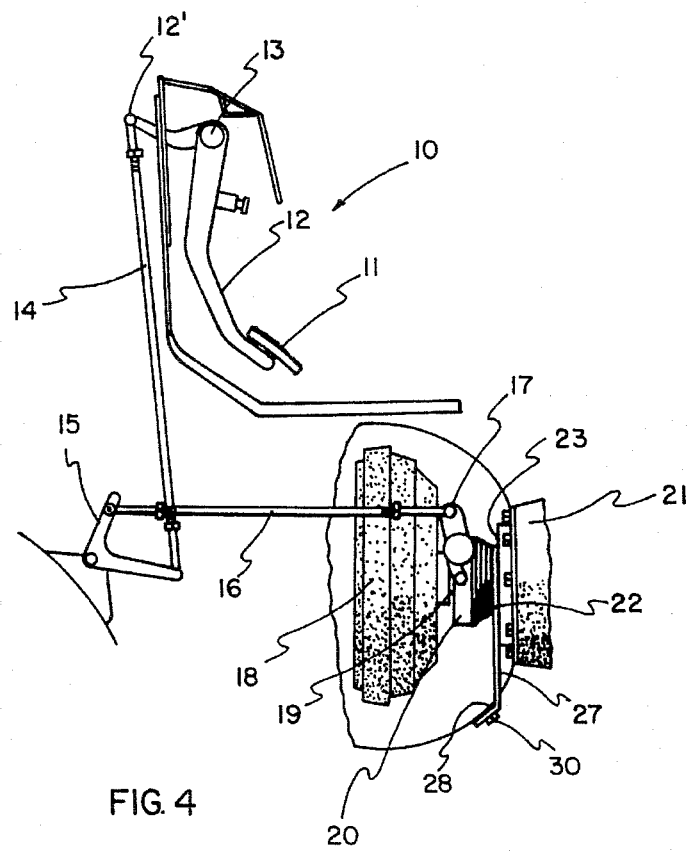
FIG. 4 is a somewhat schematic view of a clutch brake engaged with the present invention mounted thereon.

When the clutch pedal 11 is moved to the position shown in FIG. 4, the clutch release fork 17 disconnects the clutch mechanism within clutch 18 and at the same engages the clutch brake 22 and presses the same against the surface 23 of the release bearing housing 20. Since the clutch is disengaged, drive shaft 19 will be stopped from turning by the clutch brake 22.

Since the operation of vehicle clutch pedals, clutches and clutch brakes are well known to those skilled in the art, further detailed discussion of the same is not deemed necessary.

When the clutch brake 22 becomes worn to the point that when the clutch release fork 17 is in the position shown in FIG. 4, such clutch brake will not stop the rotation of drive shaft 19, or does not do so as quickly as an unworn clutch brake, then such clutch brake normally must be replaced. Until now this is done by partially disassembling the drive shaft 19 of a clutch 18 to remove the old clutch brake and replace it with a new or rebuilt one. This is a difficult job to accomplish as well as being time consuming and expensive.

The only other way until now to replace a worn clutch brake was to remove the old clutch brake with an air chisel or similar means and replace it with a clutch brake that has separable halves that are connected and held together by pins driven thereinto. A separable clutch brake is shown in U.S. Pat. No. 4,521,450 to Babcock and is sold under the tradename BABCOCK TWO-PIECE CLUTCH BRAKE, INC. The cutting out of the old clutch brake is extremely difficult and laborious and great care must be taken not to damage the drive shaft or the release bearing housing of the transmission.

Clutches 18 and their related clutch brakes 22 are mounted in bell housings 24 that have inspection openings 25 in the lower portion thereof. The inspection opening is directly below the clutch release fork 17 in the adjacent clutch brake 22.

The solution to the above indicated problems is found in the spacer of the present invention, indicated generally at 26. This spacer includes a plate portion 27 and a foot portion 28. The plate portion is preferably made from a polycarbonate resin material such as a suitable material having a thickness of between ⅛ and ⅜ inches. A U-shaped opening 29 approximately the same width as drive shaft 19 is provided in one end of the plate portion 27. The foot portion is either integrally formed on the other end of the plate portion or is secured thereto.

The foot portion 28 is disposed at an angle to the plate portion for the specific make and model of transmission and associated clutch being worked on. This foot portion is adapted to lie juxtaposed to the exterior of the bell housing 24 on opposite sides of the inspection opening 25.

To use the present invention when the clutch brake 22 becomes worn to the point that it does not operate properly, the plate that normally covers the inspection opening 25 (not shown) is removed. The plate portion 27 of spacer 26 is then passed therethrough and inserted between the worn clutch brake 22 and the flat surface 23 of the transmission housing 21 with the drive shaft 19 being disposed in the U-shaped opening 29 in the end of plate portion 27.

Figure 5:
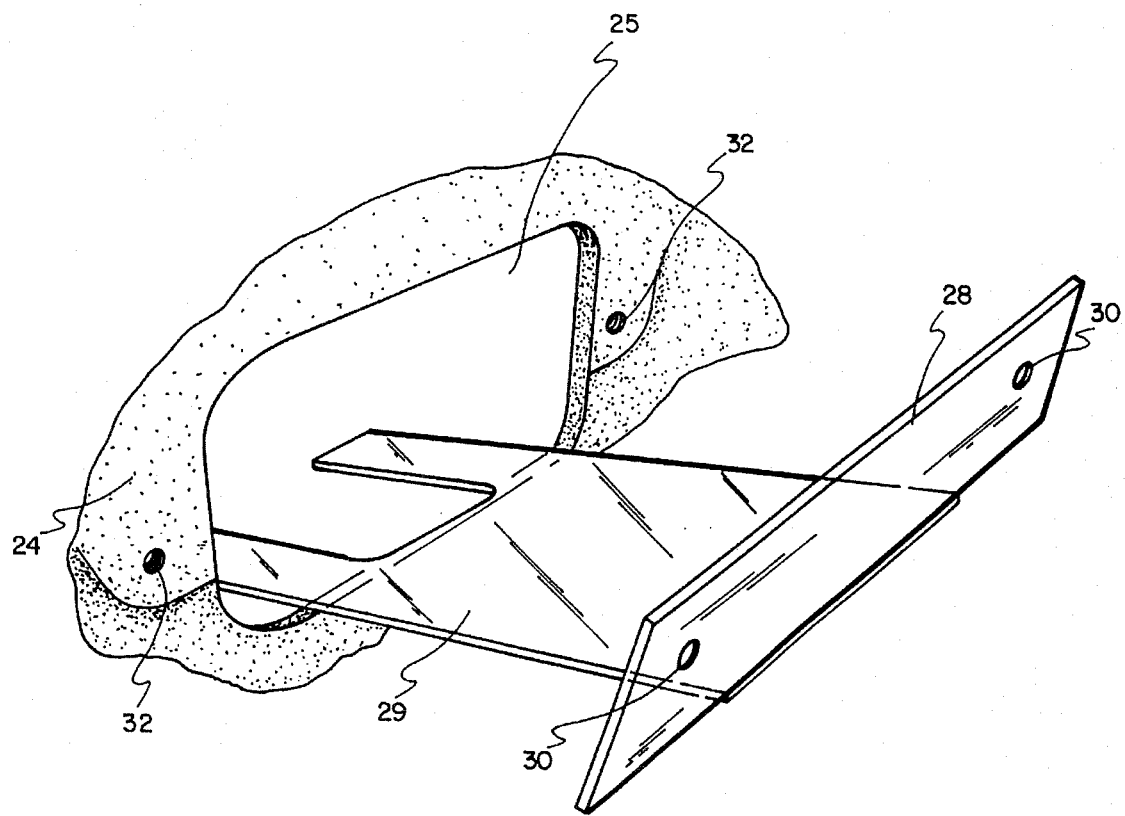
FIG. 5 is a prospective view of the present invention being installed through the inspection port of the bell housing.
Figure 6:
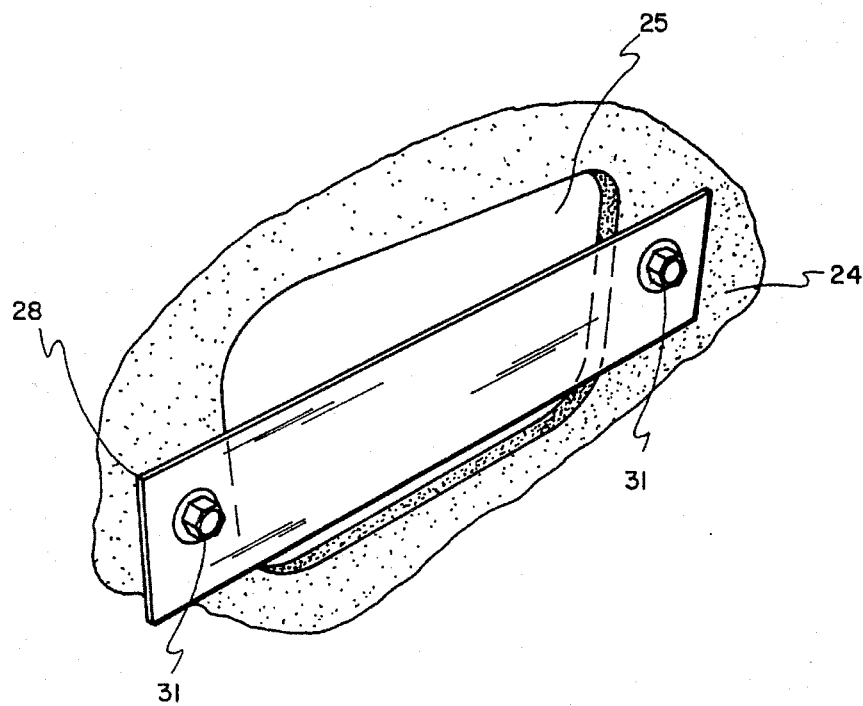
FIG. 6 is a prospective view of the present invention mounted on the bell housing.

Once the spacer 26 has been installed as described above, the foot portion 28 will lie juxtaposed to the exterior of bell housing 24. A bolt 31 can then be passed through openings 30 in foot portion 28 and be threadedly inserted into interiorly threaded openings 32 on opposite sides of inspection opening 25 of bell housing 24 as can clearly be seen in FIGS. 5 and 6.

Figure 2:
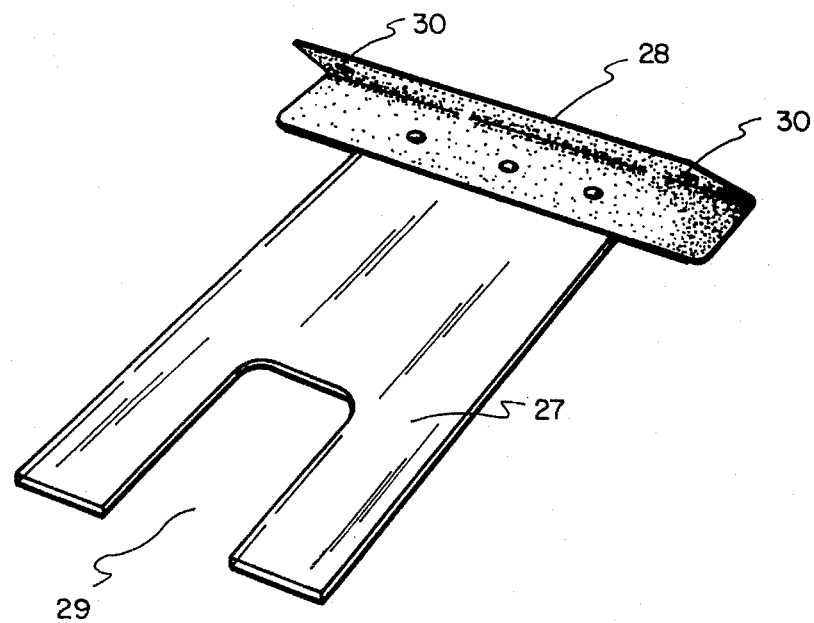
FIG. 2 is a prospective view of a second version of the present invention.

The angle that the foot portion 28 is disposed to the plate portion 27 of the spacer 26 is determined by the particular make and model of transmission and associated clutch. Some of these angles are acute and some are obtuse. Since a polycarbonate resin material such as plastics such as LEXAN can be relatively easily bent when heated without loosing strength so long as the angle is obtuse, this is the preferred manner of forming the angle between the plate portion 27 and the foot portion 28. When the angle between these two portions is acute, the foot portion can be formed from aluminum or other suitable material and then secured to the plate portion by rivets 33 or other suitable means, as seen in FIG. 2. If the spacer 26 is made of all metal, the same can be simply bent to form the foot portion 28.

Once the spacer of the present invention has been installed as described above, the clutch brake 22 can engage one side of the plate portion 27 pressing the other side thereof against the surface 23 of the transmission housing 21. By adding the spacer the clutch brake 22 will again operate in its normal manner.

When the clutch brake wears further and does not operate properly, bolts 31 are simply removed, the old spacer 26 slid out of the bell housing and a thicker spacer inserted thereinto with the bolts 31 being replaced.

It can thus be seen that the full life of the clutch brake can be realized without having to partially dismantle the clutch drive shaft nor cut the old clutch brake off and replacing it with another brake. This is a very simple and inexpensive solution to a very complex and heretofore expensive problem.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved heavy duty vehicle having a clutch assembly being operatively connected to a transmission drive shaft projecting from a transmission housing of said vehicle, said clutch assembly being disposed within a bell housing that is mechanically coupled to said transmission housing and encloses said clutch assembly, said bell housing including at least one inspection opening therein adjacent said transmission housing, said clutch assembly including a clutch release bearing housing slideably disposed about said drive shaft, said release bearing housing being operated by a clutch release fork through a clutch pedal linkage, said vehicle including a plate-like clutch brake disposed about said drive shaft so as to be continuously rotated said transmission housing, said clutch brake being adapted for longitudinal therewith and being positioned intermediate said release bearing housing and sliding movement on said drive shaft such that said release bearing housing functions to engage said clutch brake and to move the same into frictional engagement with a flat surface of said transmission housing each time said clutch assembly is operated to change gears, the improvement comprising:

- a spacer having a plate portion fixedly secured to a foot portion at one end thereof;
- a U-shaped opening in the opposite end of said plate portion; and
- at least one opening in said foot portion adapted to receive securing means whereby when said clutch brake wears to the point where it no longer operates normally, said plate portion of said spacer can be inserted through said inspection opening and interposed between said clutch brake and said transmission housing and said securing means can be inserted through said at least one opening in said foot portion and secured to said bell homing to extend the useful life of said clutch brake.

2. The vehicle of claim 1 wherein at least said plate portion of said spacer is formed from a plastic type material.

3. The vehicle of claim 2 wherein said plastic material is a polycarbonate resin such as LEXAN.

4. The vehicle of claim 3 wherein said plastic material is LEXAN.

5. The vehicle of claim 1 wherein said plate portion and said foot portion of said spacer are integrally formed.

6. The vehicle of claim 1 wherein said plate portion and said foot portion of said spacer are separably formed and are connected together.

7. The vehicle of claim 6 wherein said plate portion and said foot portion are held together by rivets.

8. The vehicle of claim 1 wherein said plate portion is between $1/8$ inch and $3/8$ inch thick.

9. A method of extending the useful life of a clutch brake in a heavy duty vehicle having a clutch assembly positioned in a operative relationship with a transmission drive shaft projecting from a transmission housing of said vehicle, said clutch assembly being disposed within a bell housing mechanically coupled to said transmission housing, said bell housing including an inspection opening therein adjacent said transmission housing, said clutch assembly including a clutch release bearing housing slideably disposed about said drive shaft, said release bearing housing being operated by a clutch release fork through a clutch pedal linkage, said vehicle including a plate-like clutch brake disposed about said drive shaft so as to be continuously rotated therewith and being positioned intermediate said release bearing housing and said transmission housing, said clutch brake being adapted for longitudinal sliding movement on said drive shaft such that said release bearing housing functions to engage said clutch brake and move the same into frictional engagement with a flat surface of said transmission housing thereby stopping the rotation of said drive shaft each time said clutch assembly is operated to shift gears, said method comprising:

- forming a spacer having a plate portion with a U-shaped opening in one end thereof and a foot portion connected to the opposite end thereof;
- passing said plate portion of said spacer through said inspection opening in said bell housing between said clutch brake and said transmission housing with said drive shaft being disposed in said U-shaped opening in one end of said plate portion; and
- securing said foot portion to said bell housing whereby the useable life of said clutch brake can be extended.

10. The method of claim 9 wherein said foot portion is secured to said bell housing by at least one bolt.

* * * * *